(12) United States Patent
Zhang et al.

(10) Patent No.: US 12,524,918 B2
(45) Date of Patent: Jan. 13, 2026

(54) CHART BASED MESH COMPRESSION

(71) Applicant: TENCENT AMERICA LLC, Palo Alto, CA (US)

(72) Inventors: Xiang Zhang, Sunnyvale, CA (US); Chao Huang, Palo Alto, CA (US); Xiaozhong Xu, Palo Alto, CA (US); Jun Tian, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 156 days.

(21) Appl. No.: 18/127,432

(22) Filed: Mar. 28, 2023

(65) Prior Publication Data
US 2023/0334712 A1  Oct. 19, 2023

Related U.S. Application Data

(60) Provisional application No. 63/331,711, filed on Apr. 15, 2022.

(51) Int. Cl.
*G06T 9/00* (2006.01)

(52) U.S. Cl.
CPC .................... *G06T 9/001* (2013.01)

(58) Field of Classification Search
CPC ............... G06T 9/001; G06T 15/40; G06T 2207/20016; G06T 2207/20021;
(Continued)

(56) References Cited

U.S. PATENT DOCUMENTS 8,731,279 B2 * 5/2014 Shin .................... H04N 13/161
348/42
2020/0221125 A1  7/2020 Budagavi et al.
(Continued)

FOREIGN PATENT DOCUMENTS

WO  2023/281929 A1  1/2023

OTHER PUBLICATIONS

International Search Report dated Jun. 21, 2023 issued by the International Searching Authority in International Application No. PCT/US 23/17678.
(Continued)

*Primary Examiner* — Ming Wu
(74) *Attorney, Agent, or Firm* — Sughrue Mion, PLLC

(57) ABSTRACT

A method performed in a decoder includes receiving a coded video bitstream that includes one or more 2D meshes corresponding to a 3D mesh. The method includes reconstructing one or more boundary vertices of each of the one or more 2D meshes. The method includes determining whether a reconstruction mode for reconstructing one or more internal vertices of each of the one or more 2D meshes is one of (i) a sampling mode and a (ii) non-sampling mode. The method includes reconstructing the one or more internal vertices of each of the one or more 2D meshes based on the determined reconstruction mode. The method further includes reconstructing the 3D mesh based on the reconstructed one or more boundary vertices of each of the one or more 2D meshes and the reconstructed one or more internal vertices of each of the one or more 2D meshes.

18 Claims, 15 Drawing Sheets

(58) Field of Classification Search
CPC . G06T 3/06; G06T 3/4007; G06T 7/11; G06T 7/70
See application file for complete search history.

(56) References Cited

U.S. PATENT DOCUMENTS

| | | | |
|---|---|---|---|
| 2020/0302571 A1 | 9/2020 | Schwarz | |
| 2020/0410752 A1* | 12/2020 | Jiang | G06T 15/20 |
| 2021/0166398 A1* | 6/2021 | Montana | G06T 7/11 |
| 2021/0217203 A1* | 7/2021 | Kim | G06T 9/001 |
| 2023/0107834 A1 | 4/2023 | Zhang et al. | |

OTHER PUBLICATIONS

Written Opinion dated Jun. 21, 2023 issued by the International Searching Authority in International Application No. PCT/US 23/17678.
Extended European Search Report issued Jul. 2, 2025 in EP Application No. 23771753.3.
Xiang Zhang (Tencent) et al., "[V-CG] Tencent's Dynamic Mesh Coding CfP Response", 138. MPEG Meeting; Apr. 25, 2022-Apr. 29, 2022; Online; (Motion Picture Expert Group or ISO/IEC JTC1/SC29/WG11).
Communication dated May 13, 2025 in Japanese Application No. 2024-527694.

* cited by examiner

CHART BASED MESH COMPRESSION

CROSS-REFERENCE TO RELATED APPLICATION

This application claims priority from U.S. Provisional Application No. 63/331,711 filed on Apr. 15, 2022, the disclosure of which is incorporated herein by reference in its entirety.

FIELD

This disclosure is directed to a set of advanced video coding technologies. More specifically, the present disclosure is directed to video based mesh compression including coding methods of chart based mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since the mesh sequence may have a significant amount of information changing over time. Therefore, efficient compression technologies are required to store and transmit such contents.

Mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to one or more embodiments, a method performed by at least one processor of a decoder, includes receiving a coded video bitstream that includes one or more two dimensional (2D) meshes corresponding to a three dimensional (3D) mesh. The method includes reconstructing one or more boundary vertices of each of the one or more 2D meshes. The method includes determining whether a reconstruction mode for reconstructing one or more internal vertices of each of the one or more 2D meshes is one of (i) a sampling mode and a (ii) non-sampling mode. The method includes reconstructing the one or more internal vertices of each of the one or more 2D meshes based on the determined reconstruction mode. The method includes reconstructing the 3D mesh based on the reconstructed one or more boundary vertices of each of the one or more 2D meshes and the reconstructed one or more internal vertices of each of the one or more 2D meshes.

According to one or more embodiments, a decoder includes: at least one memory configured to store program code, and at least one processor configured to read the program code and operate as instructed by the program code. The program code includes receiving code configured to cause the at least one processor to receive a coded video bitstream that includes one or more two dimensional (2D) meshes corresponding to a three dimensional (3D) mesh. The program code includes first reconstructing code configured to cause the at least one processor to reconstruct one or more boundary vertices of each of the one or more 2D meshes. The program code includes first determining code configured to cause the at least one processor to determine whether a reconstruction mode for reconstructing one or more internal vertices of each of the one or more 2D meshes is one of (i) a sampling mode and a (ii) non-sampling mode. The program code includes second reconstructing code configured to cause the at least one processor to reconstruct the one or more internal vertices of each of the one or more 2D meshes based on the determined reconstruction mode. The program code includes third reconstructing code configured to cause the at least one processor to reconstruct the 3D mesh based on the reconstructed one or more boundary vertices of each of the one or more 2D meshes and the reconstructed one or more internal vertices of each of the one or more 2D meshes.

According to one or more embodiments, a non-transitory computer readable medium having instructions stored therein, which when executed by a processor in a decoder cause the processor to execute: receiving a coded video bitstream that includes one or more two dimensional (2D) meshes corresponding to a three dimensional (3D) mesh; reconstructing one or more boundary vertices of each of the one or more 2D meshes; determining whether a reconstruction mode for reconstructing one or more internal vertices of each of the one or more 2D meshes is one of (i) a sampling mode and a (ii) non-sampling mode; reconstructing the one or more internal vertices of each of the one or more 2D meshes based on the determined reconstruction mode; and reconstructing the 3D mesh based on the reconstructed one or more boundary vertices of each of the one or more 2D meshes and the reconstructed one or more internal vertices of each of the one or more 2D meshes.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
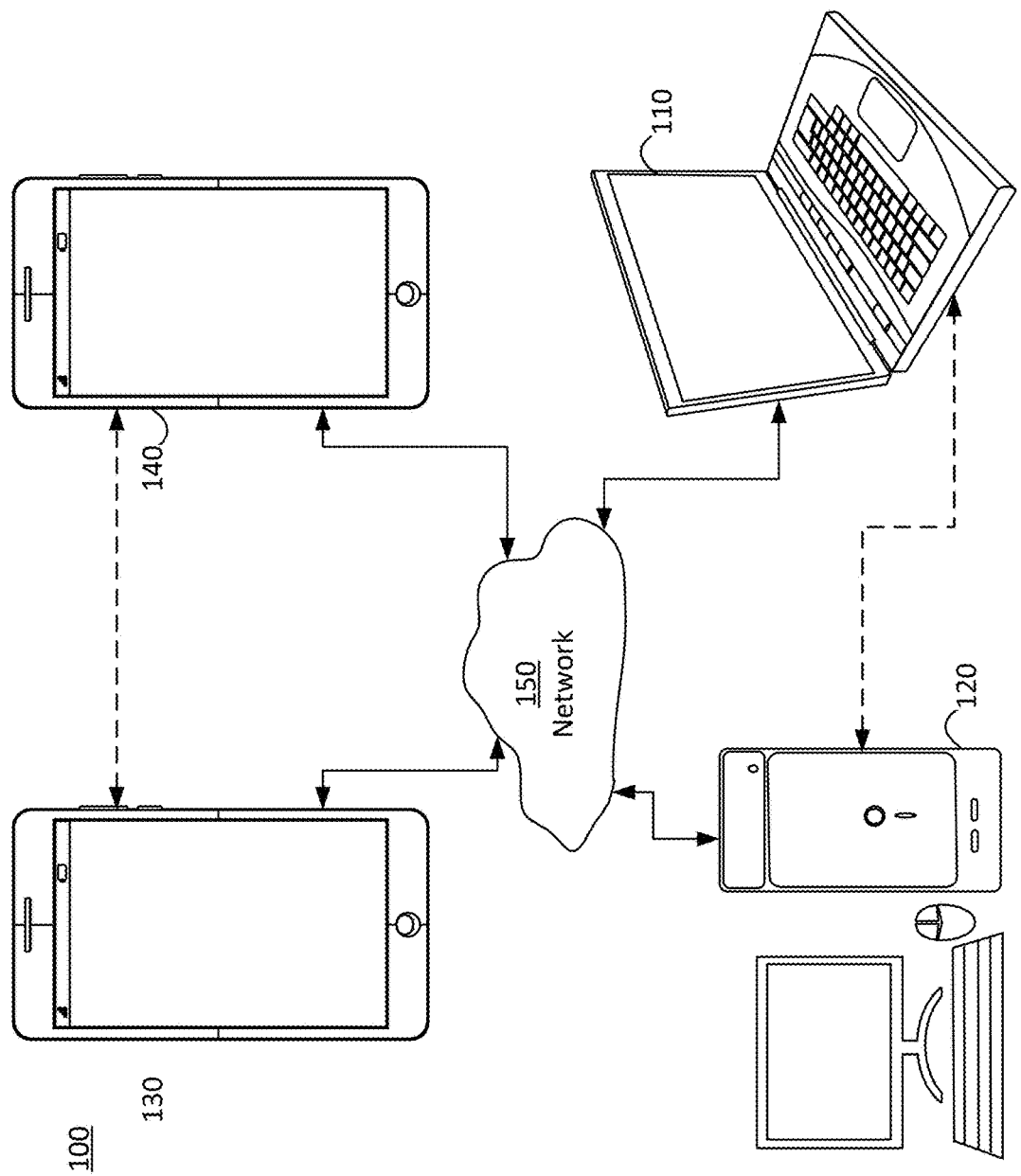
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to compressing a mesh. A mesh may be composed of several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time varying attribute maps and connectivity information. Existing standards also do not support volumetric acquisition techniques that generate a constant connectivity dynamic mesh, especially under real-time conditions.

Therefore, a new mesh compression standard to directly handle dynamic meshes with time varying connectivity information and optionally time varying attribute maps is needed. Embodiments of the present disclosure enable efficient compression technologies to store and transmit such dynamic meshes. Embodiments of the present disclosure enable lossy and/or lossless compression for various applications, such as real-time communications, storage, free viewpoint video, AR and VR.

According to one or more embodiments of the present disclosure, methods, systems, and non-transitory storage mediums for dynamic mesh compression are provided. Embodiments of the present disclosure may also be applied to static meshes, where only one frame of the mesh or the mesh content does not change over time.

Figure 2:
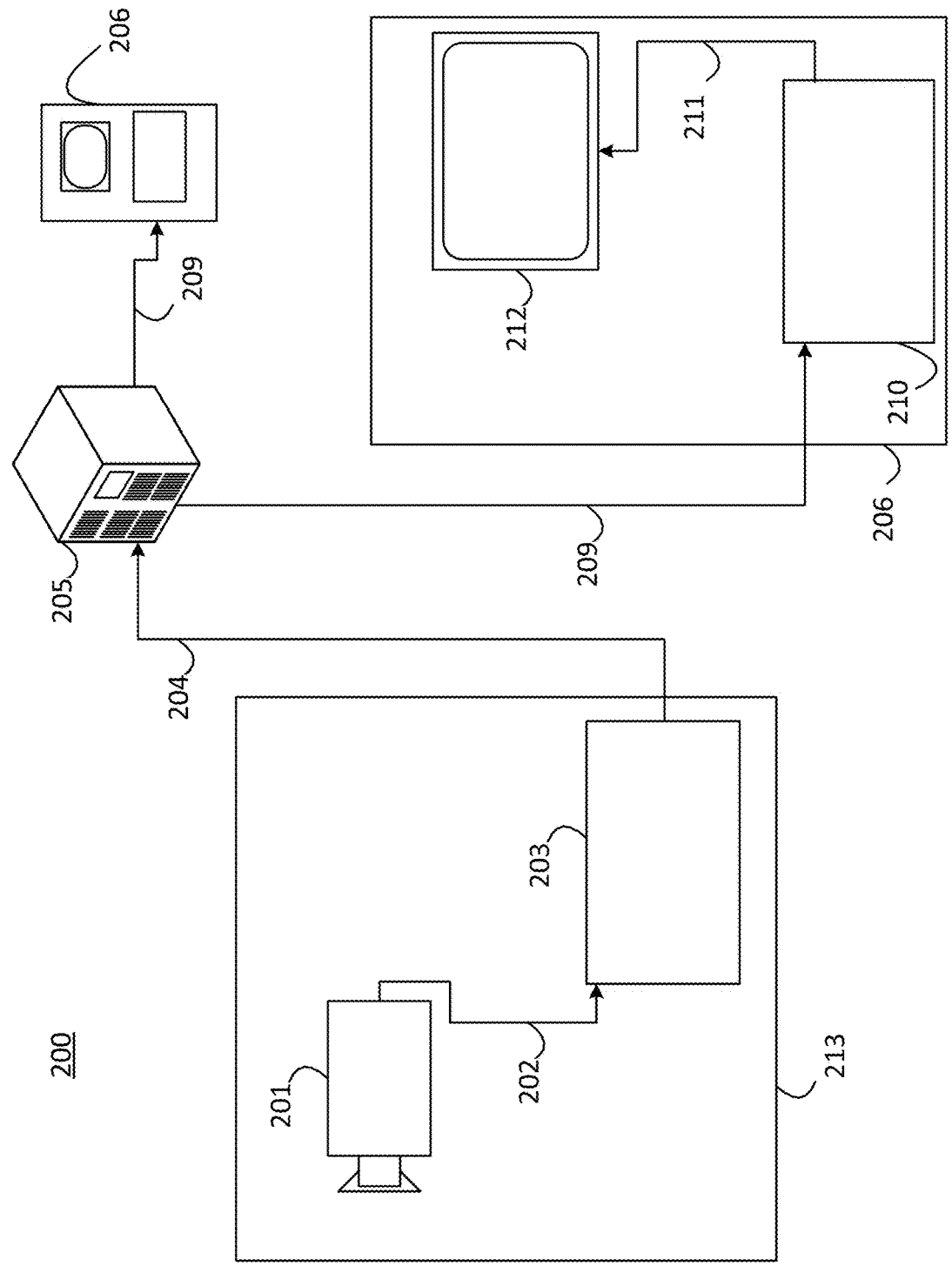
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. A 3D mesh may be composed of several polygons that describe the surface of a volumetric object. For example, the 3D mesh may contain a plurality of vertices in a 3D space where each vertex is associated with a 3D coordinate (e.g., x, y, z). The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

Figure 3:
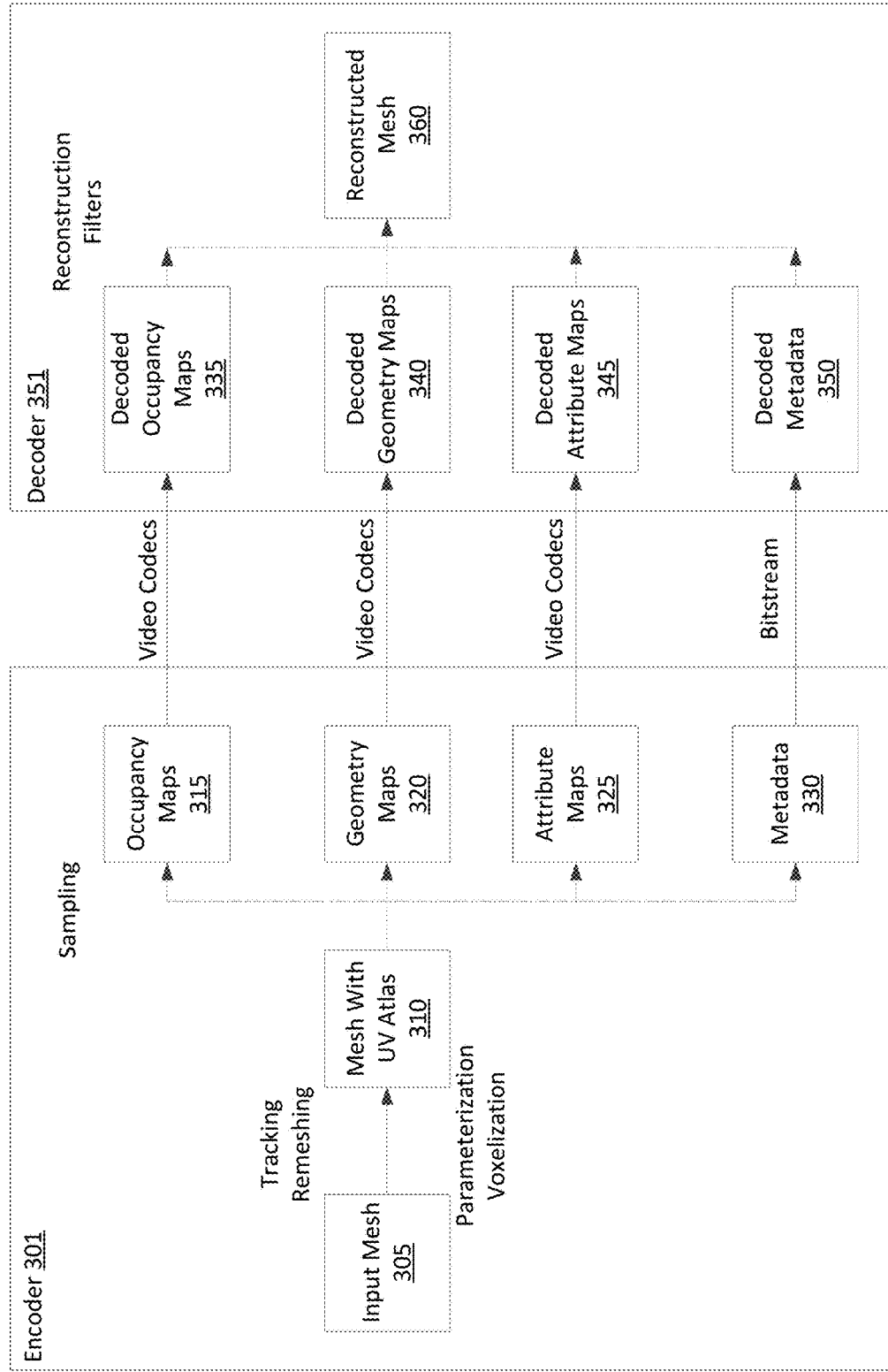
FIG. 3 is a schematic illustration of a block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to one or more embodiments of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh may be a chart of vertices each associated with a coordinate in a 2D space (e.g., 2D coordinate). Each vertex in the 2D mesh may be associated with a corresponding vertex in a 3D mesh where the vertex in the 3D mesh is associated with a coordinate in a 3D space. A compressed 2D mesh may be a version of the 2D mesh with a reduction in information compared to the uncompressed 2D mesh. For example, the 2D meshed may be sampled at a sampling rate where the compressed 2D mesh includes the sampled points. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with the UV atlas. The generated occupancy maps 335, geometry maps 340, and attribute maps 345 may be encoded using appropriate codecs (e.g., HVEC, VVC, AV1, AVS3 etc.) and transmitted to a decoder. In some embodiments, metadata (e.g., connectivity information etc.) may also be transmitted to the decoder.

In some embodiments, on the decoder side, the meshes may be reconstructed from the decoded 2D maps. Post-processing and filtering may also be applied on the reconstructed meshes. In some examples, metadata might be signaled to the decoder side for the purpose of 3D mesh reconstruction. The occupancy map may be inferred from the decoder side if the boundary vertices of each patch are signaled.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In some embodiments, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

Figure 4:
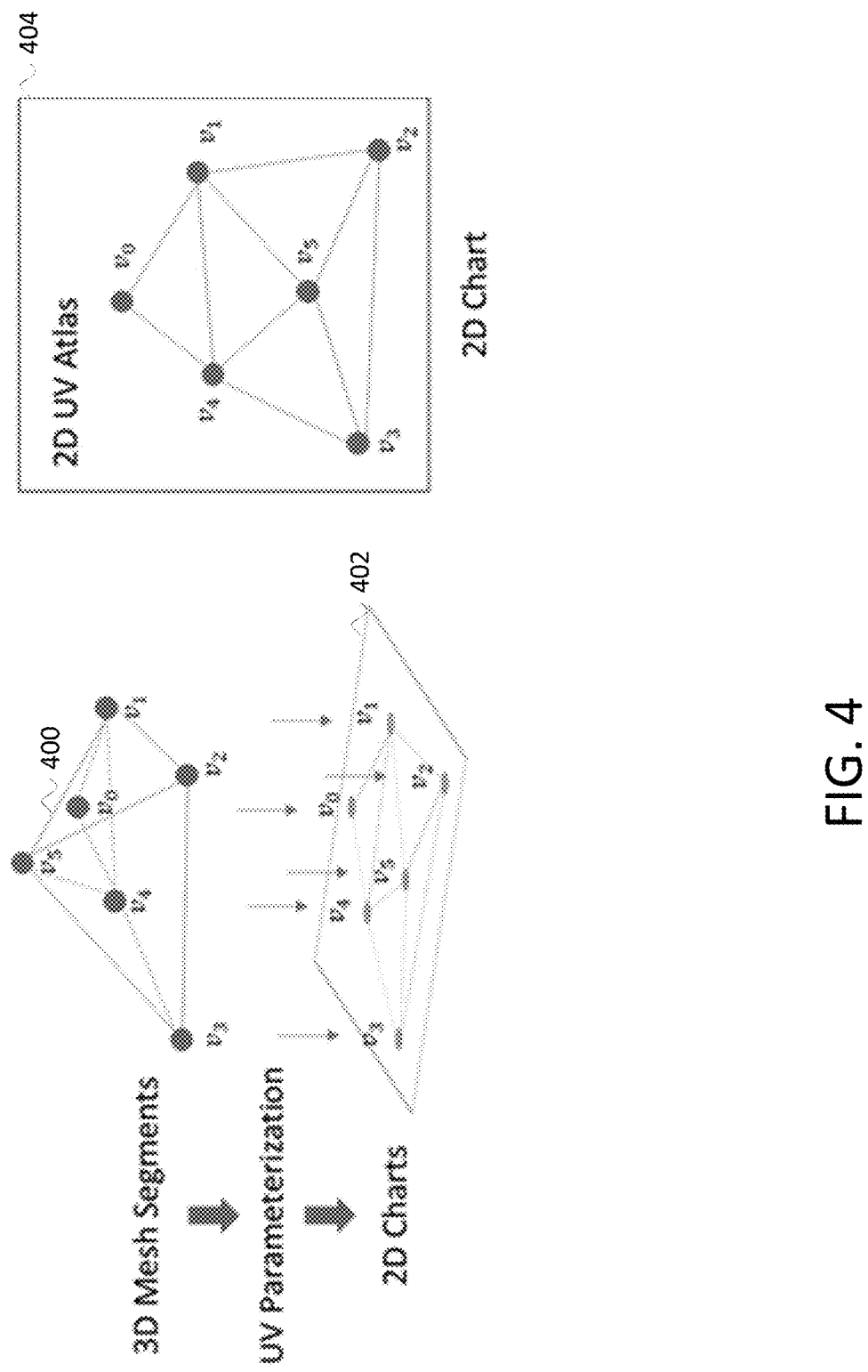
FIG. 4 illustrates an example of UV parameterization mapping from 3D mesh segments onto 2D charts, in accordance with embodiments of the present disclosure.

According to some embodiments, a 3D mesh may be partitioned into several segments (or patches/charts). Each segment may be composed of a set of connected vertices associated with their geometry, attribute, and connectivity information. As illustrated in FIG. 4, a UV parameterization process maps a mesh segment 400 onto a 2D chart in the 2D UV atlas (402, 404). Each vertex in the mesh segment may be assigned with a 2D UV coordinates in the 2D UV atlas. The vertices in a 2D chart (e.g., 2D mesh) may form a connected component as their 3D counterpart. The geometry, attribute, and connectivity information of each vertex may be inherited from their 3D counterpart as well.

Figure 5:
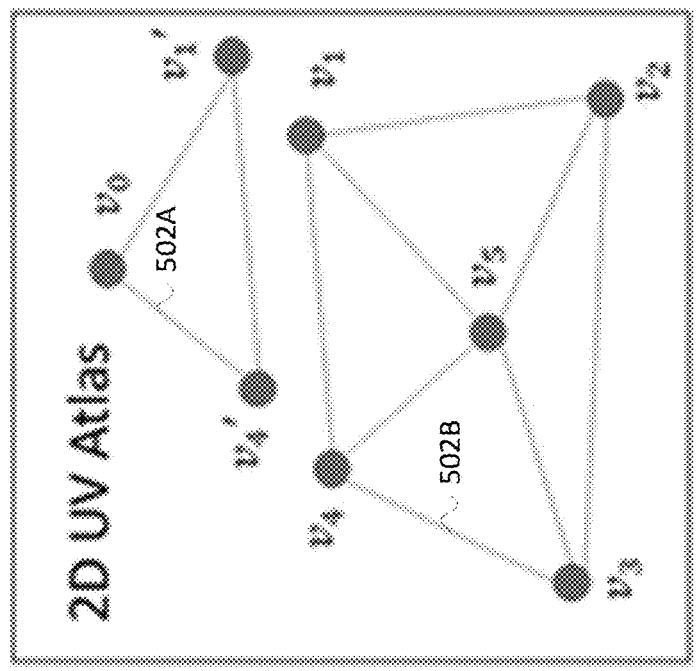
FIG. 5 illustrates an example of different UV parameterization where a 3D mesh segment is mapped to multiple separate charts
Figure 5:
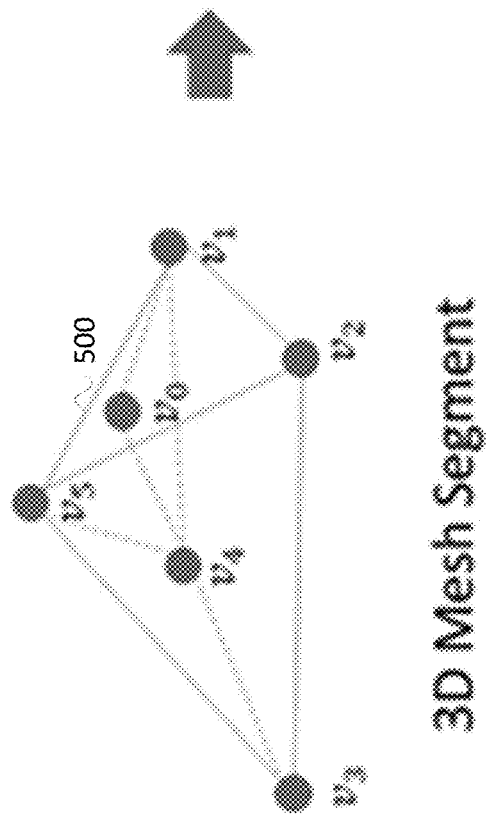

According to some embodiments, a 3D mesh segment may also be mapped to multiple separate 2D charts. When the 3D mesh segment is mapped to separate 2D charts, a vertex in the 3D mesh segment may correspond to multiple vertices in 2D UV atlas. As illustrated in FIG. 5, a 3D mesh segment 500, which may correspond to the 3D mesh segment 400, may be mapped to two 2D charts (502A, 502B), instead of a single chart, in the 2D UV atlas. As illustrated in FIG. 5, 3D vertices $v_1$ and $v_4$ have two 2D correspondences vertices $v_1'$ and $v_4'$ respectively.

Figure 6:
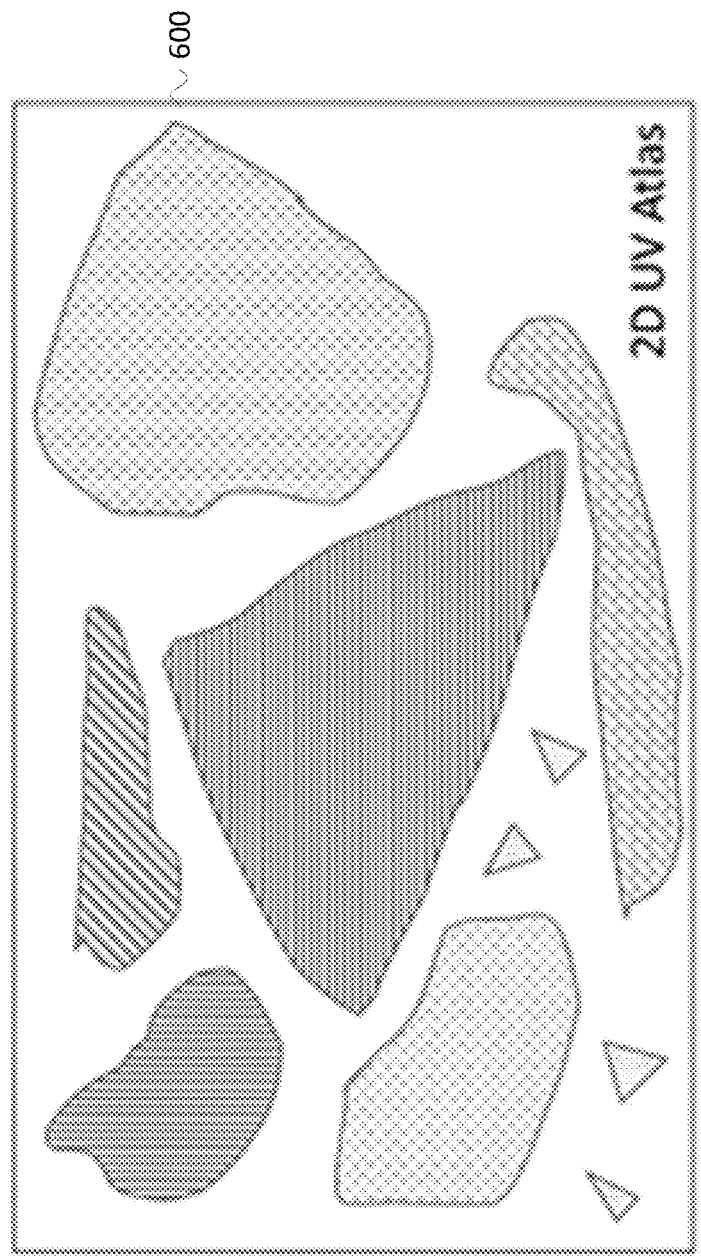
FIG. 6 illustrates an example 2D UV atlas with multiple charts, in accordance with embodiments of the present disclosure.

FIG. 6 illustrates an example of a general 2D UV atlas 600 of a 3D mesh that includes multiple charts, where each chart may contain multiple (e.g., more than or equal to 3) vertices associated with their 3D geometry, attribute, and connectivity information.

Figure 7:
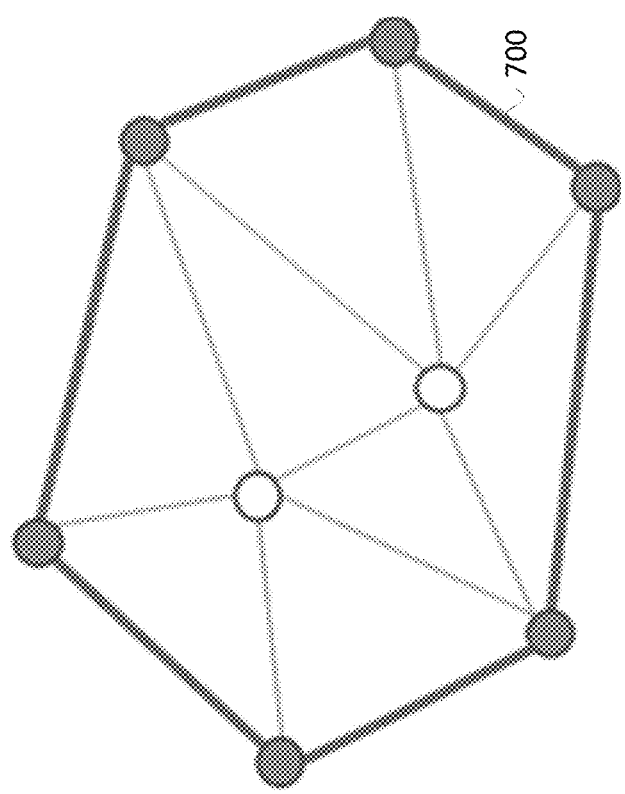
FIG. 7 illustrates an example of boundary vertices in a 2D patch, in accordance with embodiments of the present disclosure.

Boundary vertices may be defined in the 2D UV space. As shown in FIG. 7, the filled vertices are boundary vertices since they are on the boundary edges of a connected component (a patch/chart). A boundary edge may be determined by checking if the edge only appears in one triangle. The geometry information (e.g., 3D xyz coordinates) and 2D UV coordinates may be signaled in a bitstream.

A dynamic mesh sequence may require a large amount of data since it may consist of a significant amount of information changing over time. Therefore, efficient compression technologies are required to store and transmit such contents.

The embodiments of the present disclosure may be used separately or combined in any order. Furthermore, each of the methods (or embodiments), encoder, and decoder may be implemented by processing circuitry (e.g., one or more processors or one or more integrated circuits). In one example, the one or more processors execute a program that is stored in a non-transitory computer-readable medium.

Figure 8:
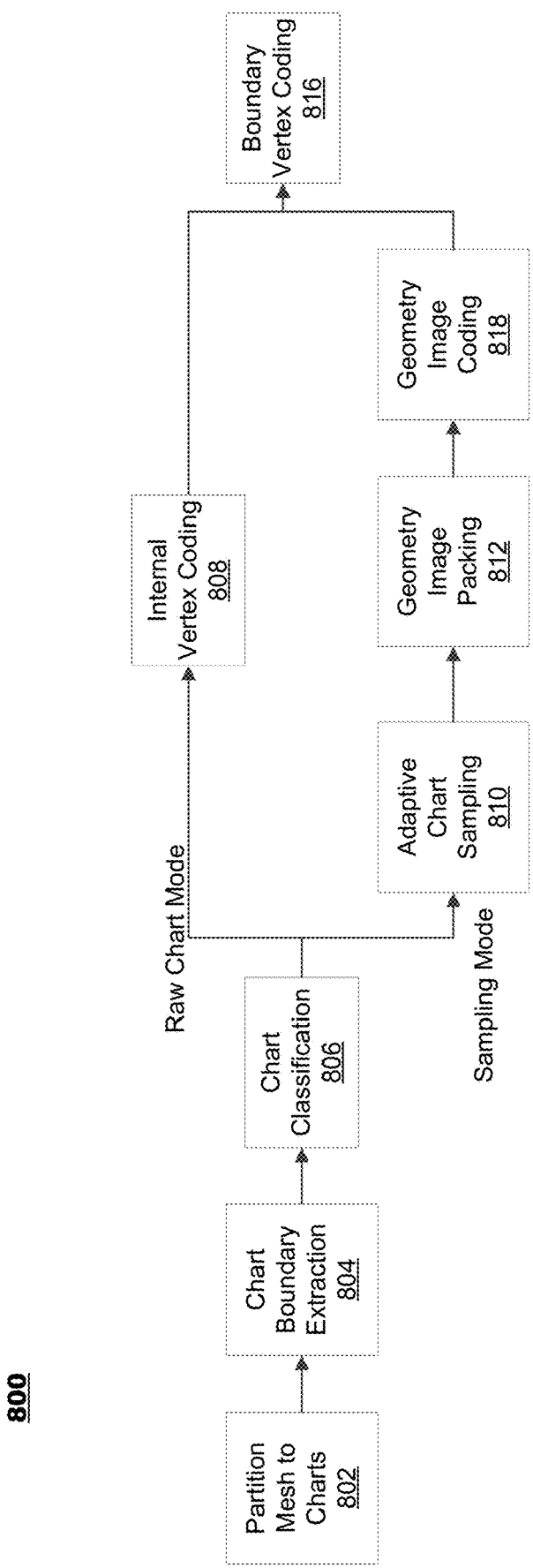
FIG. 8 illustrates an example geometry encoding pipeline, in accordance with embodiments of the present disclosure.

FIG. 8 illustrates an example geometry encoding pipeline 800, according to one or more embodiments. The encoding pipeline 800 may be performed by the encoder 301. The geometry encoding pipeline may include partitioning the mesh into connected components (e.g., charts or 2D meshes) (802). After partitioning, chart boundary extraction (804) and chart classification (806) may be performed.

In one or more examples, each chart may be coded by either raw chart mode or sampling mode based on statistics of the chart. For the raw chart mode, the internal vertices may be coded (808) directly by prediction. For the sampling mode, the chart is adaptively sampled in the 2D UV space (810) and packed into a 2D geometry image atlas 812, and subsequently coded 818. The adaptive sampling (810) may be applied to allow different charts with different sampling rates. The geometry images are then coded (818) by video codecs. The boundary vertices are extracted and coded (816) by prediction, quantization and entropy coding. In one or more examples, the texture maps may be updated by recoloring algorithms to transfer colors from the original texture maps to the new ones based on the reconstructed geometry.

Figure 9B:
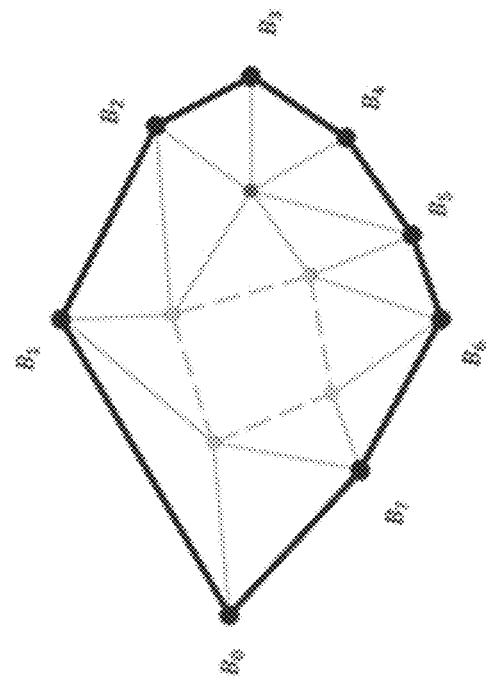
FIGS. 9(A) and 9(B) illustrate examples of chart boundary detection, in accordance with embodiments of the present disclosure.
Figure 9A:
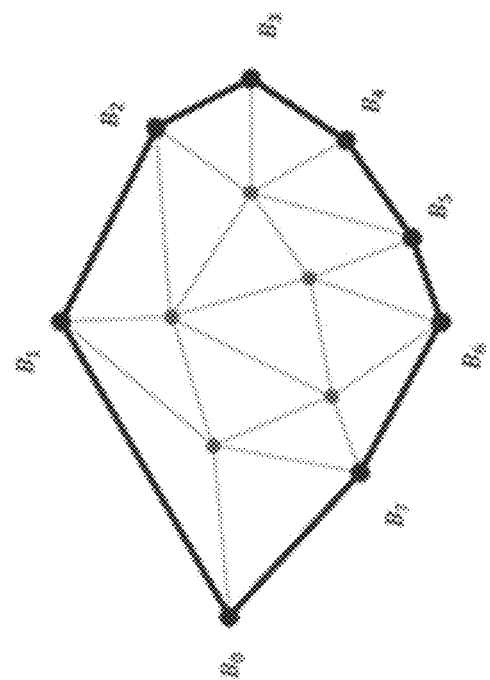

According to one or more embodiments, for each chart, the boundary vertices may be detected. The boundary vertices may be vertices that are on the boundary edges, where boundary edges are edges that are associated with a single triangle. As shown in FIGS. 9(A) and 9(B), there are two types of boundaries (e.g., exterior and interior boundaries). FIGS. 9(A) and 9(B) illustrate examples of chart boundary detection. Vertices and edges in bold may be on the exterior boundary, and vertices and dashed edges in dashed are on the interior boundary, the other vertices and edges are not belong to any boundaries. In FIG. 9(A), there is no hole with one exterior boundary, and in FIG. 9(B), there is one hole with one exterior boundary and one interior boundary.

For each chart, there is one exterior boundary loop (e.g., the solid boundary in FIGS. 9(A) and 9(B). The exterior boundary loop may be defined by vertices $B_0$, $B_1$, $B_2$, $B_3$, $B_4$, $B_5$, $B_6$, and $B_7$. These vertices may be referred to as boundary vertices. As illustrated in FIGS. 9(A) and 9(B), the edges defined by the boundary vertices appear in a single triangle. For example, the edge defined between vertices $B_0$ and $B_1$ appear in a single triangle. In one or more examples, the exterior boundary loop defines the exterior polygon of the chart, and all the other vertices may be inside this polygon. In one or more examples, there may be interior boundary loops inside the exterior boundary loop (e.g., the dashed lines in FIG. 9(B)). The interior boundary loops may be loops defined by vertices that do not define a triangle. For example, the configuration in FIG. 9A does not include any interior boundary loop, whereas the configuration in FIG. 9B includes at least one interior boundary loop (e.g., dashed lines). As illustrated in FIG. 9B, the dashed lines do not define a triangle. The interior boundary loop may correspond to the holes of the chart. In one or more examples, the vertices that do not belong to any exterior boundary loop or any interior boundary loop may be identified as internal vertices.

In some embodiments, the encoder reparameterization algorithm may eliminate holes inside a chart. By eliminating holes on the encoder side, the interior boundary loop may be eliminated from the charts (e.g., 2D meshes).

According to one or more embodiments, each chart may be coded by different methods based on the characteristics of the chart and/or one or more application scenarios. In some embodiments, two coding methods may be used. The first method may be the sampling based method, where the chart is sampled by a given sampling rate (e.g., step size), and the generated geometry and attribute maps may be coded by video codecs. The second method may be the raw chart coding mode, where the internal vertices, and the connectivity between vertices, may be coded directly without sampling.

According to one or more embodiments, a control flag may be first signaled in high-level syntax to indicate if the adaptive sampling method is applied or not. If the flag is true, adaptive sampling may be enabled such that different sampling rates may be applied for each chart. If the flag is false, the adaptive sampling may be disabled such that the same sampling rate may be applied for every chart.

In one or more examples, a base sampling rate (BS) may be signaled in a high-level syntax regardless of whether the adaptive sampling is enabled. The base sampling rate may be used in one or more of the following aspects. If the adaptive sampling is enabled, the base sampling rate may be used as a predictor. Each chart may signal the sampling rate by the difference from the base sampling rate (e.g., S-BS). If the adaptive sampling is disabled, the base sampling rate may be used as the constant sampling rate for every chart. The base sampling rate may be used as the quantization step in coding of boundary UV coordinates in a chart, including raw charts, which enables more efficient boundary information coding.

An offset in UV coordinates from the original sampled position may be signaled for each chart. The offsets, denoted as ($offset_u$, $offset_v$), may be used to find the sampled vertices in the packed geometry image. This allows different placement of texture image and geometry image.

Figure 10B:
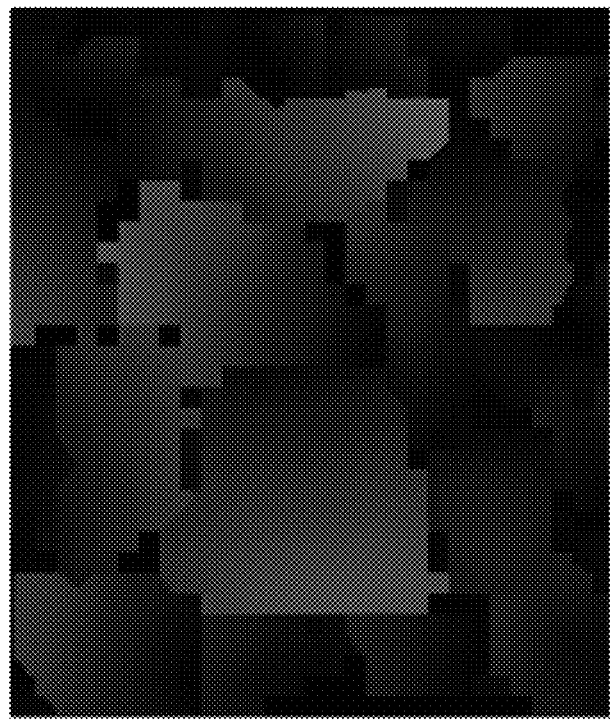
FIGS. 10(A) and 10(B) illustrate examples of geometry maps before and after, respectively, filling unoccupied pixels, in accordance with embodiments of the present disclosure.
Figure 10A:
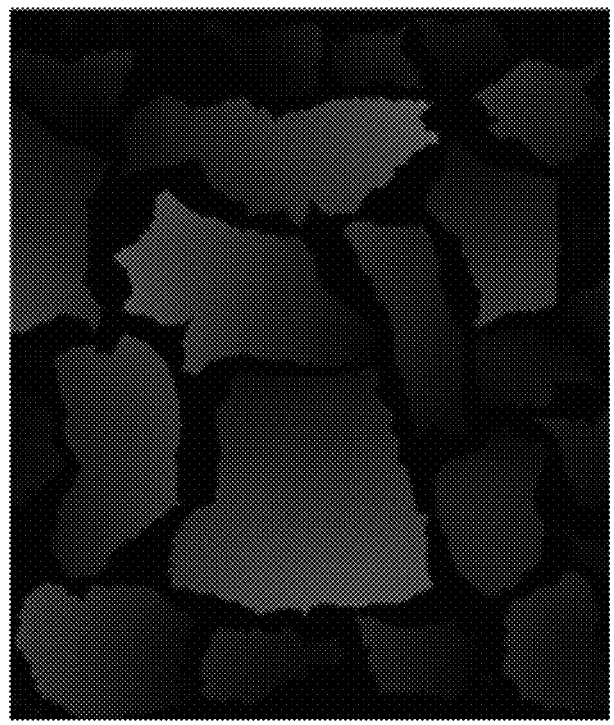

According to one or more embodiments, the geometry maps may be encoded by one or more video codecs. To improve the coding efficiency of the geometry maps, the unoccupied pixels may be filled with neighboring occupied pixels in the geometry maps, as shown in FIGS. 10(A) and 10(B). FIG. 10(A) illustrates an example geometry map before filling the unoccupied pixels, and FIG. 10(B) illustrates the example geometry map after the filling of the unoccupied pixels. In one or more examples, the occupancy information is not encoded in the bitstream, but instead, may be inferred from the boundary vertices. On the decoder side, the occupancy map may be deducted from the UV coordinates of the boundary vertices, and the occupied pixel values in the geometry map may be used for mesh reconstruction.

The boundary information, including the UV and XYZ coordinates of the boundary vertices may be predicted, quantized, and entropy coded in the bitstream. The quantization step size can be configured in the encoder side to tradeoff between the quality and the bitrates. Boundary vertices with different UV coordinates may have the same XYZ coordinates since they are from the same 3D point. To make sure the decoder reconstructed mesh is accurate across 3D boundary edges, the mapping function from 3D to 2D is maintained, otherwise there may be holes/cracks in the 3D reconstruction that may significantly degrade the visual quality of the reconstructed 3D mesh. Therefore, a UV-to-XYZ (e.g., referred to as UV2XYZ) index array may signaled to indicate the mapping function for the boundary vertices. The UV2XYZ index array may be a 1D-array of indices that map each 2D UV vertex to a 3D XYZ vertex.

In one or more examples, for each chart, the number of boundary loops in the chart may be signaled, and for each boundary loop, the number of vertices in the boundary loop may be signaled. The exterior boundary loop may be signaled before the other interior boundary loops. The following information may be signaled to convey the boundary information: (i) 2D UV coordinates of each chart; (ii) UV2XYZ index array of each chart; and (iii) unique 3D xyz coordinates. The duplicate 3D coordinates may be removed, while the correspondence may be kept in the UV2XYZ index array. The unique boundary XYZ coordinates may be coded once and shared by all charts. Since the encoder side may guarantee that each chart may only have one exterior boundary loop, the syntax table may be further simplified by skipping signaling the number of boundary loops for each chart. The coding of the UV2XYZ ensures that the reconstructed geometry is accurate across the boundaries without holes or cracks, because it keeps the uniqueness of boundary xyz vertices if they have multiple correspondences in different charts.

According to one or more embodiments, the boundary XYZ vertex information may be predicted either from the reconstructed geometry image (e.g., for sampled charts), or from the previous reconstructed boundary XYZ vertex (e.g., for raw charts). The prediction residual of boundary XYZ vertex may be derived by subtracting the original geometry from the prediction value as follows:

$$(x_{r_i}, y_{r_i}, z_{r_i}) = (x_i, y_i, z_i) - (x_{p_i}, y_{p_i}, z_{p_i}), \qquad \text{Eq. 1}$$

where ($x_i$, $y_i$, $z_i$) is the original coordinates of the $i^{th}$ boundary XYZ vertex, ($x_{p_i}$, $y_{p_i}$, $z_{p_i}$) is the predicted coordinates of the $i^{th}$ boundary XYZ vertex, and ($x_{r_i}$, $y_{r_i}$, $z_{r_i}$) is the prediction residual of the $i^{th}$ boundary XYZ vertex.

The prediction residual may be quantized and entropy coded. For example, the residual may be quantized by a scalar value as follows:

$$\left(x_{q_i}, y_{q_i}, z_{q_i}\right) = \text{round}\left\{\frac{\left(x_{r_i}, y_{r_i}, z_{r_i}\right)}{QS_{xyz}}\right\}, \qquad \text{Eq. 2}$$

where $QS_{xyz}$ is the quantization step size, which may be signaled in the high-level syntax.

The reconstructed boundary XYZ vertex may be derived as follows:

$$(\hat{x}_i, \hat{y}_i, \hat{z}_i) = (x_{p_i}, y_{p_i}, z_{p_i}) + (x_{q_i}, y_{q_i}, z_{q_i}) * QS_{xyz}. \qquad \text{Eq. 3}$$

The prediction of the boundary XYZ vertex may be determined as follows. For the boundary XYZ vertex that has correspondence in at least one sampled chart, the prediction may be derived from the reconstructed geometry image as follows:

$$\left(x_{p_i}, y_{p_i}, z_{p_i}\right) = \frac{1}{|\text{Set}(i)|} \sum_{j \in \text{Set}(i)} GIM_{REC}(\ddot{u}_j, \ddot{v}_j), \qquad \text{Eq. 4}$$

where Set($i$) is the collection of all the indices of the boundary UV vertex that corresponds to the same boundary XYZ vertex with index $i$:

$$\text{Set}(i) = \{j | UV2XYZ(j) = i\}. \qquad \text{Eq. 5}$$

$GIM_{REC}$ denotes the reconstructed geometry image, and ($\ddot{u}_j$, $\ddot{v}_j$) are the UV coordinates in the geometry image of the $j^{th}$ boundary UV vertex. ($\ddot{u}_j$, $\ddot{v}_j$) may be calculated by:

$$\ddot{u}_j = \dot{u}_j + \text{offset}_u \text{ and } \ddot{v}_j = \dot{v}_j + \text{offset}_v. \qquad \text{Eq. 6}$$

For the boundary XYZ vertex where all corresponding UV coordinates belong to raw charts, the prediction may be derived from the previous reconstructed boundary XYZ vertex as follows:

$$(x_{p_i}, y_{p_i}, z_{p_i}) = (\hat{x}_{i-1}, \hat{y}_{i-1}, \hat{z}_{i-1}) \quad \text{Eq. 7}$$

According to some embodiments, the raw chart coding mode encodes the internal vertices directly without sampling. In one or more examples, the internal vertices of raw charts may be treated as boundary vertices, and they can be concatenated with boundary vertices, where the same coding methods discussed above may be applied. In one or more examples, the internal vertices of raw charts may be separated from the boundary vertices. For example, for each raw chart, the boundary vertices may be coded first without internal vertices, and the internal vertices may be coded thereafter. The similar prediction, quantization and entropy coding schemes may be applied to internal vertices as to the boundary vertices. In one or more examples, only the UV and XYZ coordinates need to be coded, while the UV2XYZ index array is not needed for internal vertices. Both the number of boundary vertices and the number of internal vertices may be signaled for each raw chart.

Figure 11:
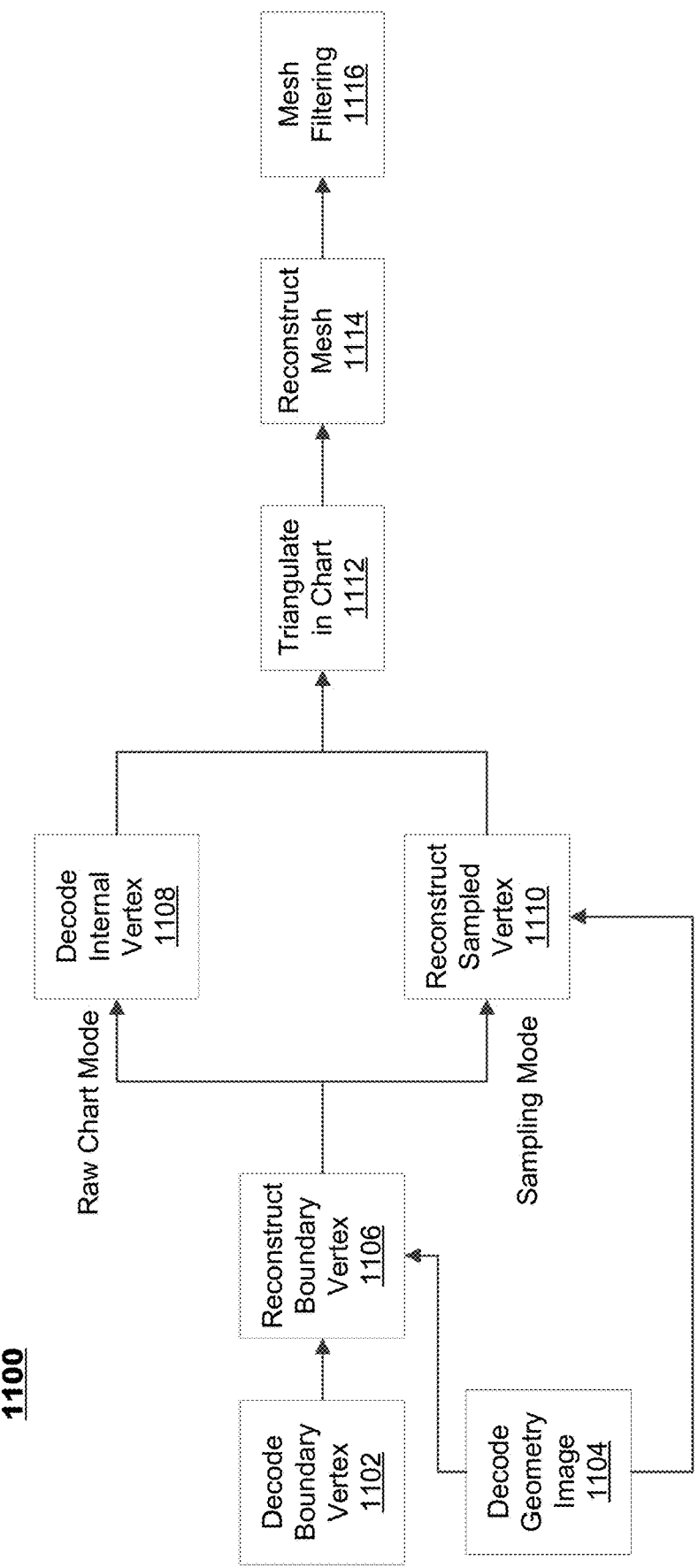
FIG. 11 illustrates an example geometry decoding pipeline, in accordance with embodiments of the present disclosure.

FIG. 11 illustrates an example geometry decoding pipeline 1100, according to one or more embodiments. The decoding pipeline 1100 may be performed by the decoder 351. The boundary vertices may decoded (1102) and reconstructed (1106) from the boundary information substream. The geometry images may decoded (1104) from video substream. For each chart, the reconstruction of internal vertices is different in terms of the coding mode (e.g., raw chart mode, sampling mode). If the raw chart mode is used, the internal vertices are decoded (1108) directly from the boundary information substream. If, the sampling mode is used, where the internal vertices are sampled vertices in the polygon defined by the boundary vertices, the sampled vertices are reconstructed (1110). After reconstruction, triangulation (1112) may be applied for each chart to derive the connectivity information among the reconstructed boundary and internal vertices, and the reconstructed mesh (1114) may be obtained. In one or more examples, the mesh filtering process (1116) may be applied to further smooth out the geometry such as on boundaries for improved reconstruction quality.

In one or more examples, the boundary XYZ vertex may be reconstructed using the decoded UV2XYZ index array for finding the correct correspondence. For example, for each chart, the decoded boundary UV coordinates may be derived by:

$$(U_i^j, V_i^j)_B = (\hat{u}_i, \hat{v}_i)^j, \quad \text{Eq. 8}$$

where $(U_i^j, V_i^j)_B$ denotes the $i^{th}$ decoded boundary uv of the $j^{th}$ chart.

In one or more examples, $i=0,1,\ldots,N^j-1$, where $N^j$ is the number of boundary vertices of the $j^{th}$ chart. The decoded boundary XYZ coordinates in the chart may be derived by:

$$(X_i^j, Y_i^j, Z_i^j)_B = (\hat{x}_{UV2XYX(i)}, \hat{y}_{UV2XYX(i)}, \hat{z}_{UV2XYX(i)}^j) \quad \text{Eq. 9}$$

where $(X_i^j, Y_i^j, Z_i^j)_B$ denotes the $i^{th}$ decoded boundary xyz of the $j^{th}$ chart.

Figure 12:
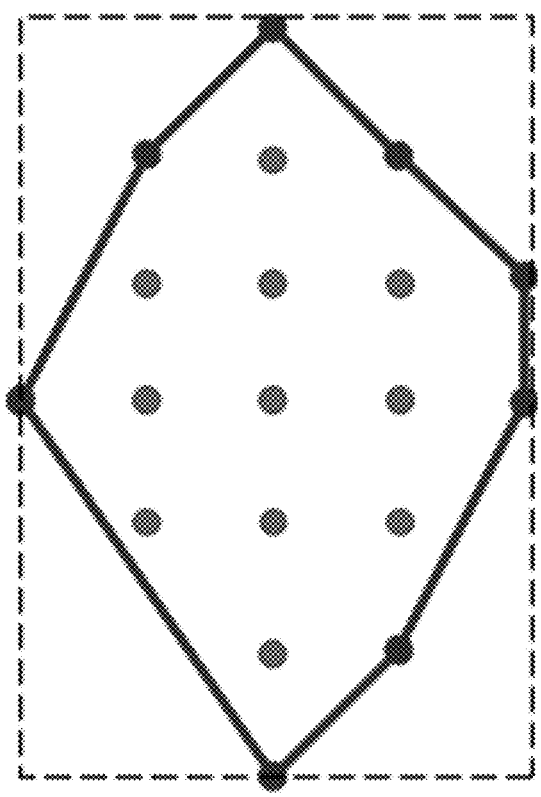
FIG. 12 illustrates an example of finding internal sampling points inside a polygon defined by a boundary.

According to some embodiments, for charts that are coded by the sampling based method, the internal vertices may be reconstructed by the decoded boundary vertices and the geometry image. For example, first, the reconstructed boundary UV coordinates may define a polygon of the chart, then every sampling point inside the bounding box of the chart is checked to see if that point is inside the polygon or not. If the point is inside the polygon, then the point is identified as an internal sampling point. FIG. 12 shows an example of a boundary polygon (e.g., connected points), where the internal sampling points are inside the boundary polygon. In one or more examples, a "cross counting" algorithm to check if a point is inside a polygon may be used. Any other suitable algorithms known to one of ordinary skill in the art may be used to check if a point is inside a polygon. For example, denote the polygon defined by the reconstructed boundary uv coordinates as:

$$\text{Polygon}^j = \{(\hat{u}_i, \hat{v}_i)_j | i=0,1,\ldots,N^j-1\}. \quad \text{Eq. 10}$$

The internal sampling UV coordinates may be denoted as:

$$(U_i^j, V_i^j)_I, \quad \text{Eq. 11}$$

where $i=0,1,\ldots,K^j-1$, and $K^j$ is the number of internal vertices of the $j^{th}$ chart.

In one or more examples, every internal vertex $(U_i^j, V_i^j)_I$ passes the check of being inside the Polygon$^j$. After passing the check, the internal sampling XYZ coordinates may be derived from the corresponding position in the decoded geometry image, by:

$$(X_i^j, Y_i^j, Z_i^j)_I = GIM_{REC}\left(\frac{U_i^j}{S^j} + \text{offset}_u^j, \frac{V_i^j}{S^j} + \text{offset}_v^j\right) \text{ for} \quad \text{Eq. 12}$$

$$i = 0, 1, \ldots, K^j - 1.$$

$S^j$ is the sampling rate of the $j^{th}$ chart, and (offset$_u^j$, offset$_v^j$) are the uv offsets in the geometry image of the $j^{th}$ chart.

According to one or more embodiments, for charts that are coded by the raw chart method, the internal vertices may be decoded and reconstructed as the boundary vertices as discussed above with respect to encoding the internal vertices using the raw chart methods. After the internal vertices are reconstructed based on the raw chart method, the reconstructed boundary vertices and internal vertices may be concatenated for each chart. Each chart obtains $N^j+K^j$ vertices, including their UV coordinates $\{(U_i^j, V_i^j)_B\}$ and $\{(U_i^j, V_i^j)_I\}$, and their XYZ coordinates $\{(X_i^j, Y_i^j, Z_i^j)_B\}$ and $\{(X_i^j, Y_i^j, Z_i^j)_I\}$.

According to one or more embodiments, the connectivity between reconstructed UV coordinates $(\{(U_i^j, V_i^j)_B\}$ and $\{(U_i^j, V_i^j)_I\})$ may be inferred by any triangulation method for each chart. In one or more examples, the triangle implementation of a constrained Delaunay triangulation may be applied for this purpose, where there is no new Steiner point introduced on the boundary edges. In one or more examples, Steiner points may allow the segments to exist in the mesh while maintaining the Delaunay property. Steiner points may also be inserted to meet constraints on the minimum angle and maximum triangle area. However, when the inserted Steiner points are located on the boundary edges, degenerated faces consisting of two boundary vertices and a Steiner point of the edge may be constructed. For example, let $B_0$ and $B_1$ denote two adjacent boundary vertices, and $S_0, S_1, \ldots$, are inserted Steiner points on the boundary edge of $B_0$ and $B_1$. Then a triangle face consisting of $B_0, B_1$ and $S_i$ is constructed, where $S_i$ can be any Steiner points on that boundary edge. The same connectivity can be applied to the reconstructed XZY coordinates $\{(X_i^j, Y_i^j, Z_i^j)_B\}$ and $\{(X_i^j, Y_i^j, Z_i^j)_I\}$.

Figure 13:
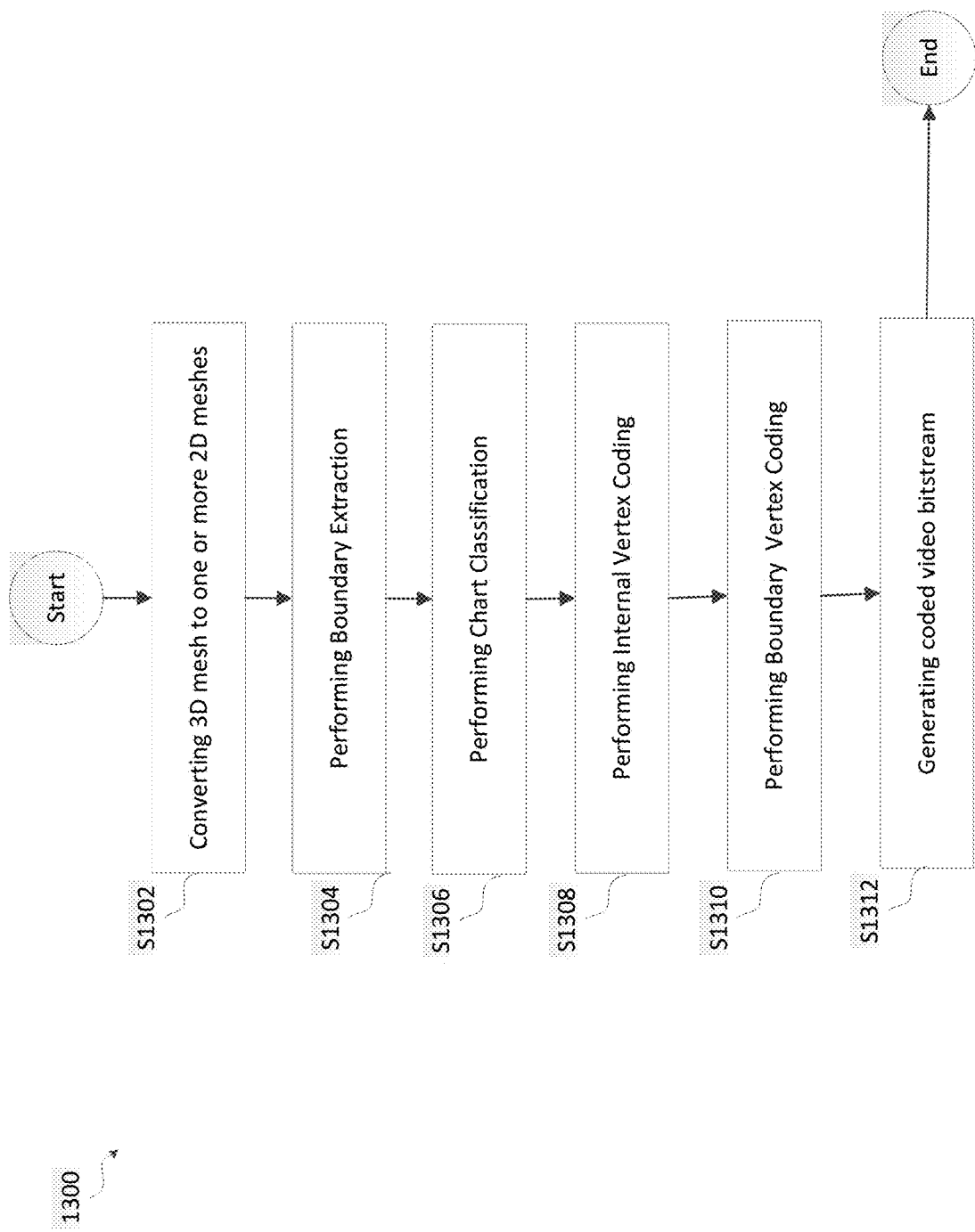
FIG. 13 illustrates an example flowchart for encoding a video bitstream, in accordance with embodiments of the present disclosure.

FIG. 13 illustrates an example process 1300 performed by an encoder, such as encoder 301, for compressing a 3D mesh and generating a coded video bitstream. The process may start at operation S1302 where a 3D mesh is converted to one or more 2D meshes as illustrated in FIG. 5, and further in accordance with the operation 802 (FIG. 8). The process proceeds to operation S1304 where boundary extraction may be performed to identify the boundary vertices in the one or more 2D meshes. For example, the boundary extraction may be performed in accordance with operation 804 (FIG. 8).

The process proceeds to operation S1306 where chart classification is performed, for example, in accordance with operation 806. The process proceeds to operation S1308 to perform internal vertex coding. For example, the internal vertices of the one or more 2D meshes may be encoded in accordance with the raw chart mode (operation 808) or the sampling mode (operations 810, 812, 818). The process proceeds to operation S1310 where boundary vertex coding is performed, for example, in accordance with operation 816. The process proceeds to operation S1312 where a coded video bitstream that includes the encoded mesh information as well as any other signaling information such as, for example, the coding mode for the internal vertices.

Figure 14:
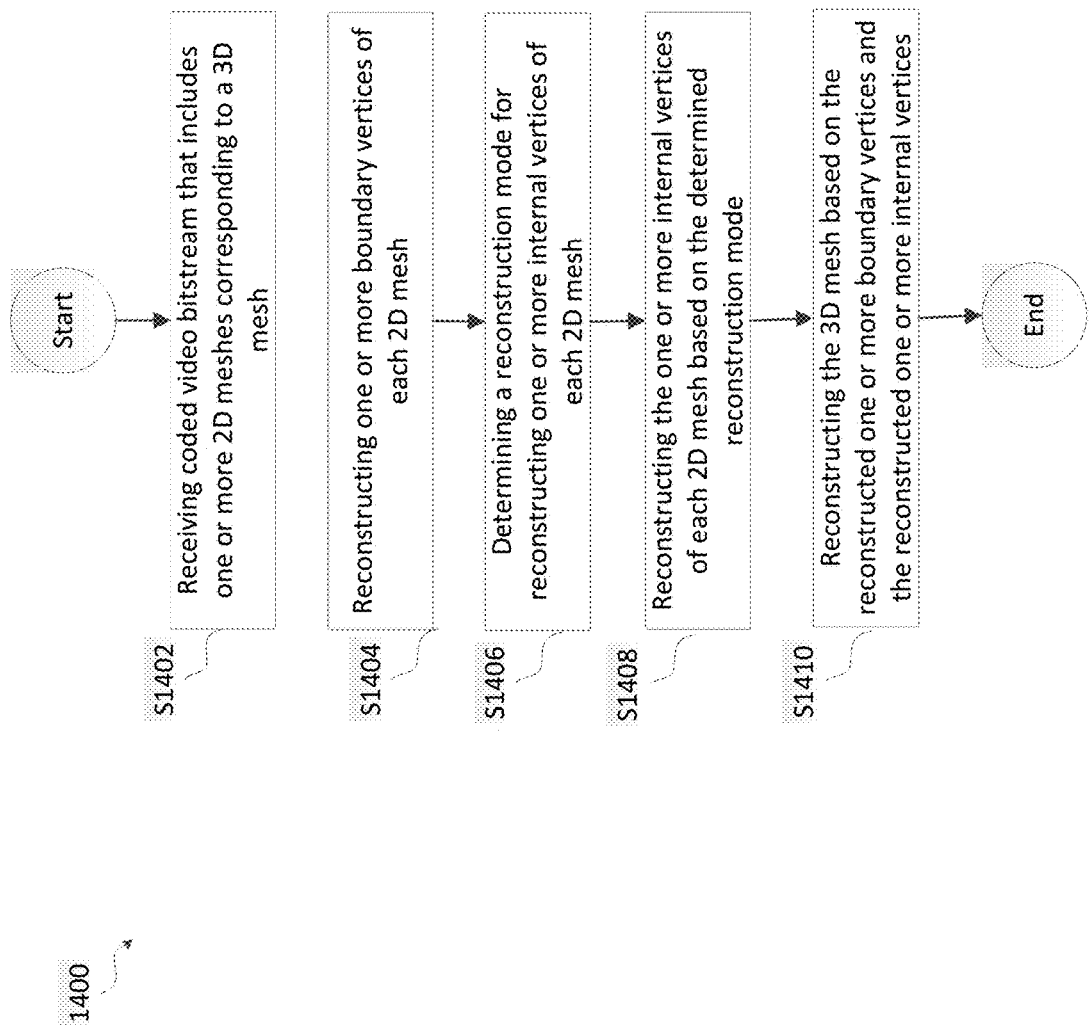
FIG. 14 illustrates an example flowchart for decoding a coded video bitstream, in accordance with embodiments of the present disclosure.

FIG. 14 illustrates an example process 1400 performed by a decoder, such as decoder 351, for decoding a video bitstream and reconstructing a 3D mesh. The process may start at operation S1402 where a coded video bitstream is received. The coded video bitstream may correspond to the bitstream generated in operation S1312 (FIG. 13). The coded video bitstream may include one or more 2D meshes corresponding to a 3D mesh.

The process proceeds to operation S1404 where one or more boundary vertices in each 2D mesh are reconstructed. The reconstruction of the boundary vertices may be performed in accordance with operation 1106 (FIG. 11). The process proceeds to operation S1406 where a reconstruction mode for reconstructing the internal vertices of the one or more 2D meshes is determined. For example, it may be determined whether to use the raw chart mode or the sampling mode to decode the internal vertices based on a flag included in the coded video bitstream.

The process proceeds to operation S1408 where the internal vertices of the one or more 2D meshes are reconstructed based on the determined reconstruction mode. The process proceeds to operation S1410 where the 3D mesh is reconstructed based on the reconstructed boundary vertices of the one or more 2D meshes and the internal vertices of the one or more 2D meshes. The reconstruction performed in operation S1410 may include the triangulation operation 1112, reconstruct mesh operation 1114, and the mesh filtering operation 1116 in FIG. 11.

The techniques, described above, may be implemented as computer software using computer-readable instructions and physically stored in one or more computer-readable media. For example, FIG. 15 shows a computer system 1500 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 15:
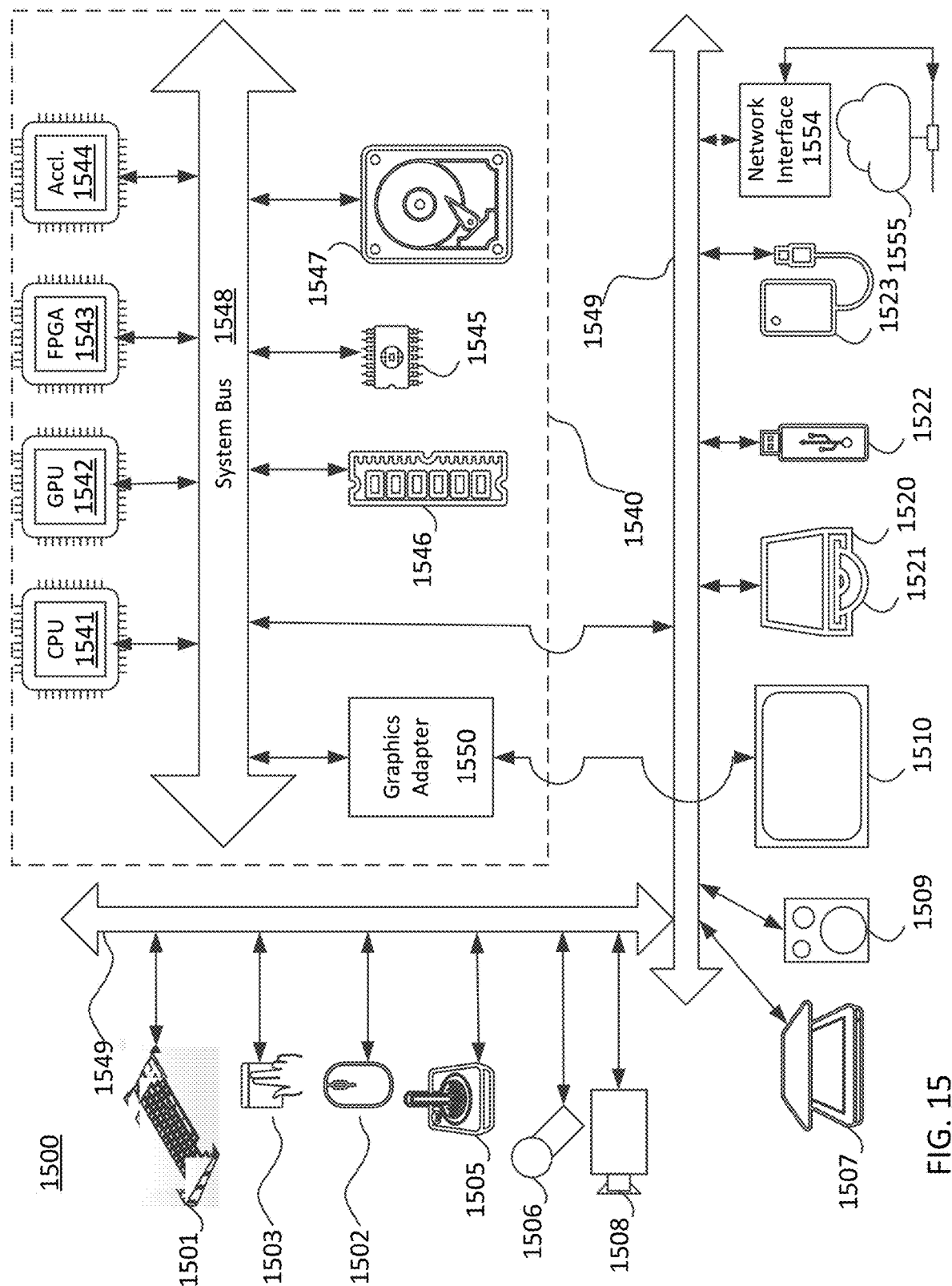
FIG. 15 is a diagram of a computer system suitable for implementing the embodiments of the present disclosure.

The components shown in FIG. 15 for computer system 1500 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1500.

Computer system 1500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1501, mouse 1502, trackpad 1503, touch screen 1510, data-glove, joystick 1505, microphone 1506, scanner 1507, camera 1508.

Computer system 1500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1510, data glove, or joystick 1505, but there may also be tactile feedback devices that do not serve as input devices). For example, such devices may be audio output devices (such as: speakers 1509, headphones (not depicted)), visual output devices (such as screens 1510 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1500 may also include human accessible storage devices and their associated media such as optical media including CD/DVD ROM/RW 1520 with CD/DVD or the like media 1521, thumb-drive 1522, removable hard drive or solid state drive 1523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1500 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1549 (such as, for example USB ports of the computer system 1500; others are commonly integrated into the core of the computer system 1500 by attachment to a system bus as described below (for example Ethernet interface into a PC computer system or cellular network interface into a smartphone computer system). Using any of these networks, computer system 1500 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1555. Certain protocols and protocol stacks may be used on each of those networks and network interfaces as described above.

Aforementioned human interface devices, human-accessible storage devices, and network interfaces 1554 may be attached to a core 1540 of the computer system 1500.

The core 1540 may include one or more Central Processing Units (CPU) 1541, Graphics Processing Units (GPU) 1542, specialized programmable processing units in the form of Field Programmable Gate Areas (FPGA) 1543, hardware accelerators for certain tasks 1544, and so forth. These devices, along with Read-only memory (ROM) 1545, Random-access memory 1546, internal mass storage such as internal non-user accessible hard drives, SSDs, and the like 1547, may be connected through a system bus 1548. In some computer systems, the system bus 1548 may be accessible in the form of one or more physical plugs to enable extensions by additional CPUs, GPU, and the like. The peripheral devices may be attached either directly to the core's system bus 1548, or through a peripheral bus 1549. Architectures for a peripheral bus include PCI, USB, and the like. A graphics adapter 1550 may be included in the core 1540.

CPUs 1541, GPUs 1542, FPGAs 1543, and accelerators 1544 may execute certain instructions that, in combination, may make up the aforementioned computer code. That computer code may be stored in ROM 1545 or RAM 1546. Transitional data may be also be stored in RAM 1546, whereas permanent data may be stored for example, in the internal mass storage 1547. Fast storage and retrieve to any of the memory devices may be enabled through the use of cache memory, that may be closely associated with one or more CPU 1541, GPU 1542, mass storage 1547, ROM 1545, RAM 1546, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1500, and specifically the core 1540 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1540 that are of non-transitory nature, such as core-internal mass storage 1547 or ROM 1545. The software implementing various embodiments of the present disclosure may be stored in such devices and executed by core 1540. A computer-readable medium may include one or more memory devices or chips, according to particular needs. The software may cause the core 1540 and specifically the processors therein (including CPU, GPU, FPGA, and the like) to execute particular processes or particular parts of particular processes described herein, including defining data structures stored in RAM 1546 and modifying such data structures according to the processes defined by the software. In addition or as an alternative, the computer system may provide functionality as a result of logic hardwired or otherwise embodied in a circuit (for example: accelerator 1544), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of a decoder, the method comprising: receiving a coded video bitstream that includes one or more two dimensional (2D) meshes corresponding to a three dimensional (3D) mesh; reconstructing one or more boundary vertices of each of the one or more 2D meshes; determining whether a reconstruction mode for reconstructing one or more internal vertices of each of the one or more 2D meshes is one of (i) a sampling mode and a (ii) non-sampling mode; reconstructing the one or more internal vertices of each of the one or more 2D meshes based on the determined reconstruction mode; and reconstructing the 3D mesh based on the reconstructed one or more boundary vertices of each of the one or more 2D meshes and the reconstructed one or more internal vertices of each of the one or more 2D meshes.

(2) The method according to feature (1), in which the determination of the reconstruction mode is based on a flag included in the coded video bitstream.

(3) The method of feature (1) or (2), further comprising decoding one or more geometry maps included in the coded video bitstream.

(4) The method of feature (3), in which based on determining the reconstruction mode is the sampling mode, the reconstructing the one or more internal vertices of each of the one or more 2D meshes comprises: determining a boundary polygon for each of the one or more 2D meshes based on corresponding reconstructed boundary vertices for each of the one or more 2D meshes, identifying each vertex included in the boundary polygon for each of the one or more 2D meshes as an internal vertex.

(5) The method of feature (4), in which the reconstructing the 3D mesh includes deriving an internal vertex in the 3D mesh based on a corresponding position in the decoded one or more geometry maps, a sampling rate, and an offset in the decoded one or more geometry maps.

(6) The method of any one of features (1)-(5), in which based on the determining the reconstruction mode is the non-sampling mode, the one or more internal vertices of each one or more 2D meshes are reconstructed based on the reconstructed one or more boundary vertices of each of the one or more 2D meshes.

(7) The method of feature (6), in which the reconstructing the 3D mesh includes reconstructing an internal vertex in the 3D mesh by concatenating a reconstructed internal vertex of the one or more 2D meshes with a corresponding reconstructed boundary vertex in the one or more 2D meshes.

(8) The method according to any one of features (1)-(7), in which the reconstructing the 3D mesh includes reconstructing a boundary vertex in the 3D mesh based on a 2D to 3D index array that maps corresponding one or more reconstructed boundary vertices of each of the one or more 2D meshes to the boundary vertex in the 3D mesh.

(9) A decoder comprising: at least one memory configured to store program code; and at least one processor configured to read the program code and operate as instructed by the program code, the program code including: receiving code configured to cause the at least one processor to receive a coded video bitstream that includes one or more two dimensional (2D) meshes corresponding to a three dimensional (3D) mesh; first reconstructing code configured to cause the at least one processor to reconstruct one or more boundary vertices of each of the one or more 2D meshes; first determining code configured to cause the at least one processor to determine whether a reconstruction mode for reconstructing one or more internal vertices of each of the one or more 2D meshes is one of (i) a sampling mode and a (ii) non-sampling mode; second reconstructing code configured to cause the at least one processor to reconstruct the one or more internal vertices of each of the one or more 2D meshes based on the determined reconstruction mode; and third reconstructing code configured to cause the at least one processor to reconstruct the 3D mesh based on the reconstructed one or more boundary vertices of each of the one or more 2D meshes and the reconstructed one or more internal vertices of each of the one or more 2D meshes.

(10) The decoder according to feature (9), in which the determination of the reconstruction mode is based on a flag included in the coded video bitstream.

(11) The decoder of feature (9) or (10), in which the program code further includes decoding code configured to cause the at least one processor to decode one or more geometry maps included in the coded video bitstream.

(12) The decoder of feature (11), in which the second reconstructing code further includes, based on determining the reconstruction mode is the sampling mode: second determining code configured to cause the at least one processor to determine a boundary polygon for each of the one or more 2D meshes based on corresponding reconstructed boundary vertices for each of the one or more 2D meshes, and identifying code configured to cause the at least one processor to identify each vertex included in the boundary polygon for each of the one or more 2D meshes as an internal vertex.

(13) The decoder of feature (12), in which the third reconstructing code further includes deriving code configured to cause the at least one processor to derive an internal vertex in the 3D mesh based on a corresponding position in the decoded one or more geometry maps, a sampling rate, and an offset in the decoded one or more geometry maps.

(14) The decoder of any one of features (9)-(13), in which based on the determining the reconstruction mode is the non-sampling mode, the one or more internal vertices of each one or more 2D meshes are reconstructed based on the reconstructed one or more boundary vertices of each of the one or more 2D meshes.

(15) The decoder of feature (14), in which the third reconstructing code further includes fourth reconstructing code configured to cause the at least one processor to reconstruct an internal vertex in the 3D mesh by concatenating a reconstructed internal vertex of the one or more 2D meshes with a corresponding reconstructed boundary vertex in the one or more 2D meshes.

(16) The decoder according to any one of features (9)-(15), in which the third reconstructing code further includes fourth reconstructing code configured to cause the at least one processor to reconstruct a boundary vertex in the 3D mesh based on a 2D to 3D index array that maps corresponding one or more reconstructed boundary vertices of each of the one or more 2D meshes to the boundary vertex in the 3D mesh.

(17) A non-transitory computer readable medium having instructions stored therein, which when executed by at least one processor in a decoder cause the at least one processor to execute: receiving a coded video bitstream that includes one or more two dimensional (2D) meshes corresponding to a three dimensional (3D) mesh; reconstructing one or more boundary vertices of each of the one or more 2D meshes; determining whether a reconstruction mode for reconstructing one or more internal vertices of each of the one or more 2D meshes is one of (i) a sampling mode and a (ii) non-sampling mode; reconstructing the one or more internal vertices of each of the one or more 2D meshes based on the determined reconstruction mode; and reconstructing the 3D mesh based on the reconstructed one or more boundary vertices of each of the one or more 2D meshes and the reconstructed one or more internal vertices of each of the one or more 2D meshes.

(18) The non-transitory computer readable medium according to feature (17), in which the determination of the reconstruction mode is based on a flag included in the coded video bitstream.

(19) The non-transitory computer readable medium of feature (17) or (18), in which the instructions further case the at least one processor to execute decoding one or more geometry maps included in the coded video bitstream.

(20) The non-transitory computer readable medium of feature (19), in which based on determining the reconstruction mode is the sampling mode, the reconstructing the one or more internal vertices of each of the one or more 2D meshes further comprises: determining a boundary polygon for each of the one or more 2D meshes based on corresponding reconstructed boundary vertices for each of the one or more 2D meshes, identifying each vertex included in the boundary polygon for each of the one or more 2D meshes as an internal vertex.

What is claimed is:
1. A method performed by at least one processor of a decoder, the method comprising:
receiving a coded video bitstream that includes one or more two dimensional (2D) meshes corresponding to a three dimensional (3D) mesh;
reconstructing one or more boundary vertices of each of the one or more 2D meshes;
determining whether a reconstruction mode for reconstructing one or more internal vertices of each of the one or more 2D meshes is one of (i) a sampling mode and a (ii) non-sampling mode in which a first 2D mesh from the one or more 2D meshes is encoded in accordance with the sampling mode and a second 2D mesh from the one or more 2D meshes is encoded in accordance with the non-sampling mode;

reconstructing the one or more internal vertices of each of the one or more 2D meshes based on the determined reconstruction mode; and reconstructing the 3D mesh based on the reconstructed one or more boundary vertices of each of the one or more 2D meshes and the reconstructed one or more internal vertices of each of the one or more 2D meshes, wherein when the determining the reconstruction mode is the non-sampling mode, the one or more internal vertices of each one or more 2D meshes are reconstructed using prediction coding with respect to the reconstructed one or more boundary vertices of each of the one or more 2D meshes.

2. The method according to claim 1, wherein the determination of the reconstruction mode is based on a flag included in the coded video bitstream.

3. The method of claim 1, further comprising decoding one or more geometry maps included in the coded video bitstream.

4. The method of claim 3, wherein based on determining the reconstruction mode is the sampling mode, the reconstructing the one or more internal vertices of each of the one or more 2D meshes comprises:
  determining a boundary polygon for each of the one or more 2D meshes based on corresponding reconstructed boundary vertices for each of the one or more 2D meshes,
  identifying each vertex included in the boundary polygon for each of the one or more 2D meshes as an internal vertex.

5. The method of claim 4, wherein the reconstructing the 3D mesh includes deriving an internal vertex in the 3D mesh based on a corresponding position in the decoded one or more geometry maps, a sampling rate, and an offset in the decoded one or more geometry maps.

6. The method of claim 1, wherein the reconstructing the 3D mesh includes reconstructing an internal vertex in the 3D mesh by concatenating a reconstructed internal vertex of the one or more 2D meshes with a corresponding reconstructed boundary vertex in the one or more 2D meshes.

7. The method according to claim 1, wherein the reconstructing the 3D mesh includes reconstructing a boundary vertex in the 3D mesh based on a 2D to 3D index array that maps corresponding one or more reconstructed boundary vertices of each of the one or more 2D meshes to the boundary vertex in the 3D mesh.

8. A decoder comprising:
  at least one memory configured to store program code; and
  at least one processor configured to read the program code and operate as instructed by the program code, the program code including:
  receiving code configured to cause the at least one processor to receive a coded video bitstream that includes one or more two dimensional (2D) meshes corresponding to a three dimensional (3D) mesh;
  first reconstructing code configured to cause the at least one processor to reconstruct one or more boundary vertices of each of the one or more 2D meshes;
  first determining code configured to cause the at least one processor to determine whether a reconstruction mode for reconstructing one or more internal vertices of each of the one or more 2D meshes is one of (i) a sampling mode and a (ii) non-sampling mode in which a first 2D mesh from the one or more 2D meshes is encoded in accordance with the sampling mode and a second 2D mesh from the one or more 2D meshes is encoded in accordance with the non-sampling mode;
  second reconstructing code configured to cause the at least one processor to reconstruct the one or more internal vertices of each of the one or more 2D meshes based on the determined reconstruction mode; and
  third reconstructing code configured to cause the at least one processor to reconstruct the 3D mesh based on the reconstructed one or more boundary vertices of each of the one or more 2D meshes and the reconstructed one or more internal vertices of each of the one or more 2D meshes,
  wherein when the determining the reconstruction mode is the non-sampling mode, the one or more internal vertices of each one or more 2D meshes are reconstructed using prediction coding with respect to the reconstructed one or more boundary vertices of each of the one or more 2D meshes.

9. The decoder according to claim 8, wherein the determination of the reconstruction mode is based on a flag included in the coded video bitstream.

10. The decoder of claim 8, wherein the program code further includes decoding code configured to cause the at least one processor to decode one or more geometry maps included in the coded video bitstream.

11. The decoder of claim 10, wherein the second reconstructing code further includes, based on determining the reconstruction mode is the sampling mode:
  second determining code configured to cause the at least one processor to determine a boundary polygon for each of the one or more 2D meshes based on corresponding reconstructed boundary vertices for each of the one or more 2D meshes, and
  identifying code configured to cause the at least one processor to identify each vertex included in the boundary polygon for each of the one or more 2D meshes as an internal vertex.

12. The decoder of claim 11, wherein the third reconstructing code further includes deriving code configured to cause the at least one processor to derive an internal vertex in the 3D mesh based on a corresponding position in the decoded one or more geometry maps, a sampling rate, and an offset in the decoded one or more geometry maps.

13. The decoder of claim 8, wherein the third reconstructing code further includes fourth reconstructing code configured to cause the at least one processor to reconstruct an internal vertex in the 3D mesh by concatenating a reconstructed internal vertex of the one or more 2D meshes with a corresponding reconstructed boundary vertex in the one or more 2D meshes.

14. The decoder according to claim 8, wherein the third reconstructing code further includes fourth reconstructing code configured to cause the at least one processor to reconstruct a boundary vertex in the 3D mesh based on a 2D to 3D index array that maps corresponding one or more reconstructed boundary vertices of each of the one or more 2D meshes to the boundary vertex in the 3D mesh.

15. A non-transitory computer readable medium having instructions stored therein, which when executed by at least one processor in a decoder cause the at least one processor to execute:
  receiving a coded video bitstream that includes one or more two dimensional (2D) meshes corresponding to a three dimensional (3D) mesh;
  reconstructing one or more boundary vertices of each of the one or more 2D meshes;

determining whether a reconstruction mode for reconstructing one or more internal vertices of each of the one or more 2D meshes is one of (i) a sampling mode and a (ii) non-sampling mode in which a first 2D mesh from the one or more 2D meshes is encoded in accordance with the sampling mode and a second 2D mesh from the one or more 2D meshes is encoded in accordance with the non-sampling mode;

reconstructing the one or more internal vertices of each of the one or more 2D meshes based on the determined reconstruction mode; and reconstructing the 3D mesh based on the reconstructed one or more boundary vertices of each of the one or more 2D meshes and the reconstructed one or more internal vertices of each of the one or more 2D meshes, wherein when the determining the reconstruction mode is the non-sampling mode, the one or more internal vertices of each one or more 2D meshes are reconstructed using prediction coding with respect to the reconstructed one or more boundary vertices of each of the one or more 2D meshes.

16. The non-transitory computer readable medium according to claim 15, wherein the determination of the reconstruction mode is based on a flag included in the coded video bitstream.

17. The non-transitory computer readable medium of claim 15, wherein the instructions further case the at least one processor to execute decoding one or more geometry maps included in the coded video bitstream.

18. The non-transitory computer readable medium of claim 17, wherein based on determining the reconstruction mode is the sampling mode, the reconstructing the one or more internal vertices of each of the one or more 2D meshes further comprises:

determining a boundary polygon for each of the one or more 2D meshes based on corresponding reconstructed boundary vertices for each of the one or more 2D meshes, identifying each vertex included in the boundary polygon for each of the one or more 2D meshes as an internal vertex.

* * * * *